Figure 3:
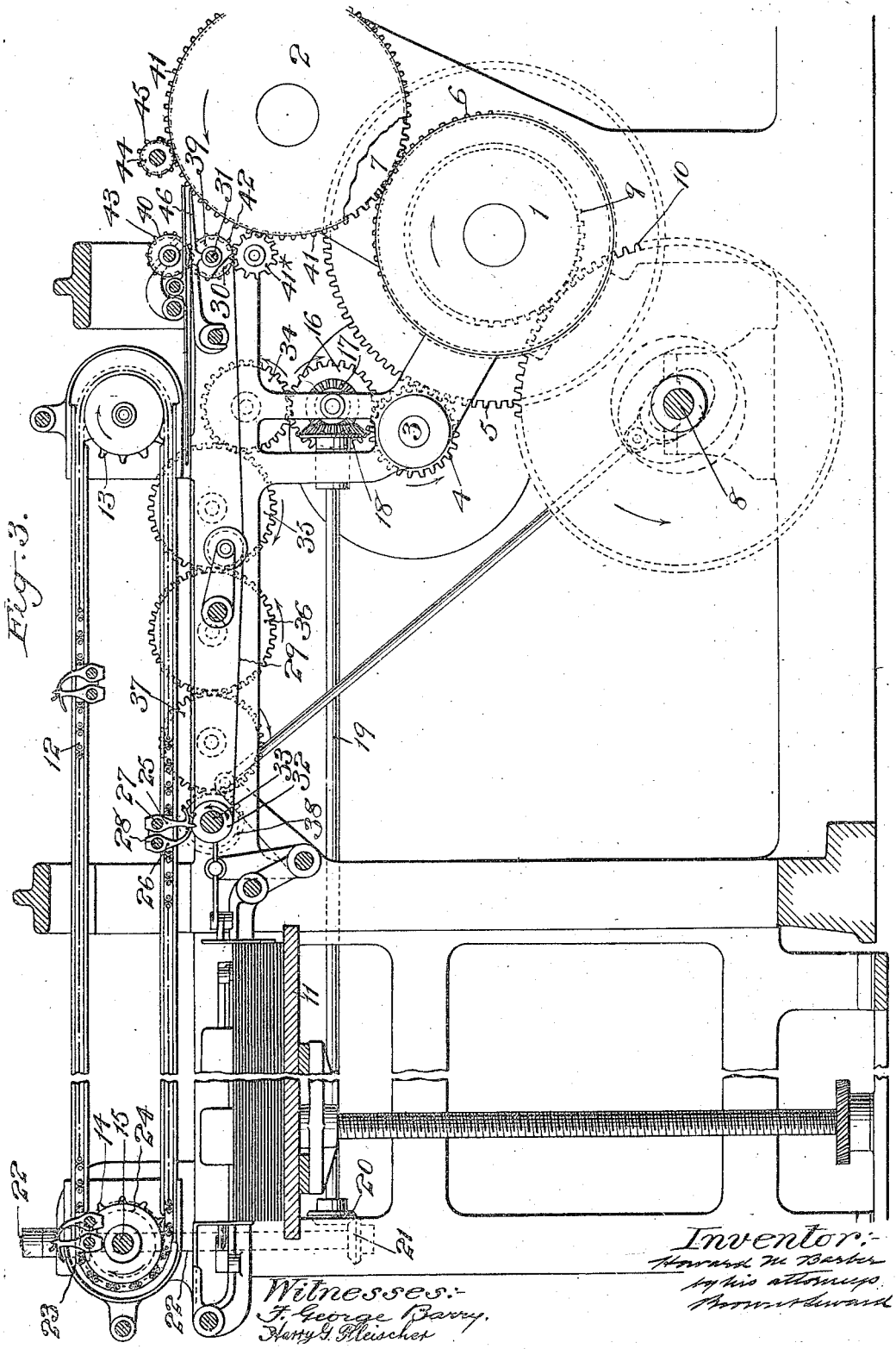

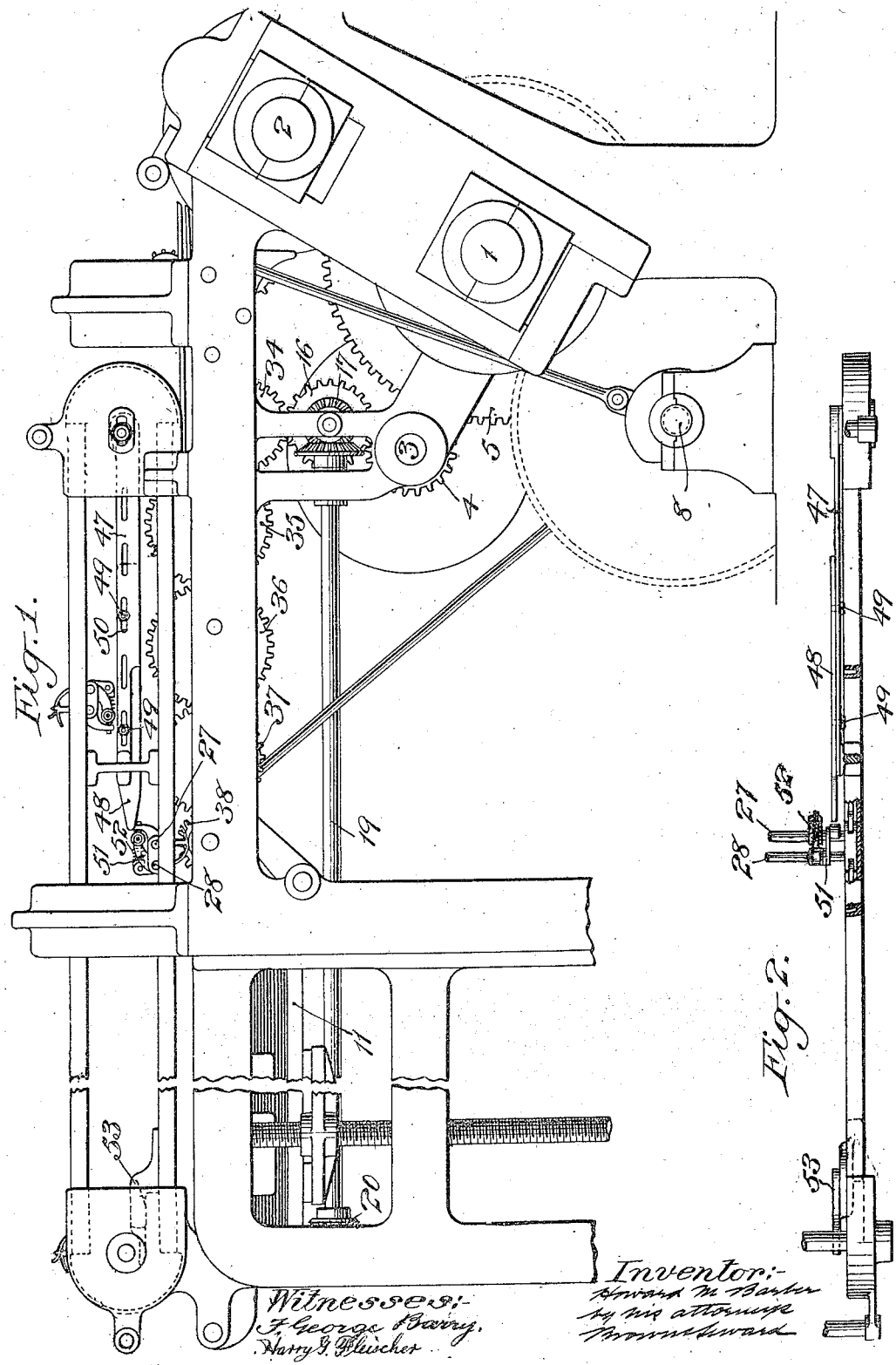

UNITED STATES PATENT OFFICE.

HOWARD M. BARBER, OF STONINGTON, CONNECTICUT, ASSIGNOR, BY MESNE ASSIGNMENTS, TO C. B. COTTRELL & SONS COMPANY, OF NEW YORK, N. Y., A CORPORATION OF DELAWARE.

SHEET-DELIVERY MECHANISM FOR ROTARY PRINTING-MACHINES.

1,147,697.   Specification of Letters Patent.   Patented July 27, 1915.

Application filed October 3, 1912. Serial No. 723,730.

*To all whom it may concern:*

Be it known that I, HOWARD M. BARBER, a citizen of the United States, and resident of Stonington, in the county of New London and State of Connecticut, have invented new and useful Improvements in Sheet-Delivery Mechanism for Rotary Printing-Machines, of which the following is a specification.

This invention comprises certain improvements in the construction, form, arrangement and operation of the several parts of a sheet delivery mechanism for rotary printing machines whereby sheets of various lengths may be accurately delivered to a predetermined point.

In the accompanying drawings, the invention is shown in connection with a two revolution rotary cylinder printing machine.

Figure 1 represents in side elevation portions of a two revolution rotary cylinder printing machine having my improved delivery mechanism applied thereto, Fig. 2 is a detail plan view partly in section along one side of the delivery mechanism to illustrate the position laterally of the machine of the cams for controlling the operation of the sheet delivery grippers, and Fig. 3 is a longitudinal vertical section through the delivery mechanism and its adjacent parts.

The form cylinder is denoted by 1 and its impression cylinder by 2. The form cylinder 1 is driven from the drive shaft 3 through the gears 4 and 5 and the impression cylinder 2 is driven from the form cylinder 1 through the gears 6 and 7. The cam shaft 8 is driven from the form cylinder 1 through the gears 9 and 10. The sheet receiving table 11 may be raised and lowered by any suitable means.

An endless delivery carrier and an endless tape carrier are provided for conveying the sheets from the printing and impression cylinders to the receiving table 11. The side chains 12 of the endless delivery carrier pass around sprockets 13, 14, at the receiving and delivery ends of the carrier. The shaft 15 on which the sprockets 14 are mounted is driven from the drive shaft 3 through the spur gears 4, 16, bevel gears 17, 18, shaft 19, bevel gears 20, 21, shaft 22 and bevel gears 23, 24. The ratio of this train of gearing is such that the endless delivery carrier is driven at a slower speed than the surface speed of the printing and impression cylinders. This endless delivery carrier is provided with one or more sets of grippers. In the present instance, three sets of grippers are shown arranged to receive and deliver the sheets as the grippers are moved outwardly along the under side of the delivery carrier. Each pair of grippers comprises a stationary jaw 25 and a movable jaw 26 mounted on bars 27 and 28, which bars are attached to the side chains 12 of the delivery carrier.

Means are provided for feeding the sheets from the impression cylinder 2 to the endless delivery carrier grippers as follows: The tapes 29 of an endless tape carrier pass around pulleys 30 on the shaft 31 at the receiving end of the tape carrier and around pulleys 32 on the shaft 33 at the delivery end of the said tape carrier. This shaft 33 is driven from the spur gear 16 through the chain of gears 34, 35, 36, 37, 38. The ratio of this train of gearing is such that the endless tape carrier is driven at the surface speed of the printing and impression cylinders. Sheet forwarding rolls 39 and 40 are located at the receiving end of the tape carrier and are positively driven from the gear 41 on the shaft of the impression gear 2 through the train of gears 41*, 42, 43. The rollers 44 have their gear 45 driven from the gear 41 and are arranged to coact with the form cylinder 2 for delivering the sheets onto the stripper fingers 46.

A receiving cam is provided, which cam has a fixed member 47 for controlling the opening of the grippers to receive the sheets and an adjustable member 48 for controlling the closing of the grippers on the advance edge of the sheet at the proper time. The means for adjusting the cam member 48 with respect to the member 47 is herein shown as comprising screw bolts 49 passing through elongated slots 50 in the member 47. The bar 28 to which the movable grippers are fixed is provided with a rocking arm 51 arranged in the plane of the cam 47, 48.

The movable jaws 26 are normally held closed by a spring 52. A cam 53 is arranged at the delivery end of the endless delivery carrier for controlling the opening of the grippers at the proper time for delivering the sheet onto the sheet receiving table 11.

The adjustable member 48 of the receiving cam 47, 48, is adjusted so as to permit the closing of the grippers upon the advance edge of the sheet at the proper time according to the length of sheet being delivered from the machine. It is intended that the closing of these grippers on the advance edge of the sheet will be simultaneous with the releasing of the back edge of the sheet from the forwarding pulleys 39, 40.

From the above description, it will be seen that a very simple and effective means is employed for insuring the accurate delivery of sheets of various lengths from the printing and impression cylinders onto the sheet receiving table, without the use of a positive sheet feeding device interposed between the forwarding rolls and the grippers, as the release of the sheets from the forwarding rolls can be accurately timed with respect to the closing of the delivery grippers onto the sheet.

What I claim is:—

1. In a sheet delivery apparatus for printing machines, a delivery device having grippers, means extending along beneath the delivery device for feeding sheets to the grippers, fixed means controlling the opening of the grippers to receive the sheets, adjustable means controlling the closing of the grippers at different points in their movement to engage the advance edges of sheets of various lengths, and means controlling the opening of the grippers to release the sheets.

2. In a sheet delivery apparatus for printing machines, a delivery device having grippers arranged to travel at a certain speed, means extending along beneath the delivery device, arranged to travel at a higher speed for feeding sheets to the grippers, fixed means controlling the opening of the grippers to receive the sheets, adjustable means controlling the closing of the grippers at different points in their movement to engage the advance edges of sheets of various lengths, and means controlling the opening of the grippers to release the sheets.

3. In a sheet delivery apparatus for printing machines, an endless delivery carrier having grippers thereon, an endless tape carrier extending along beneath the delivery carrier for feeding sheets to the grippers, fixed means controlling the opening of the grippers to receive the sheets, adjustable means controlling the closing of the grippers at different points in their movement to engage the advance edges of sheets of various lengths, and means controlling the opening of the grippers to release the sheets.

4. In a sheet delivery apparatus for printing machines, an endless delivery carrier having grippers thereon, arranged to travel at a certain speed, an endless tape carrier extending along beneath the delivery carrier, arranged to travel at a higher speed for feeding sheets to the grippers, fixed means controlling the opening of the grippers to receive the sheets, adjustable means controlling the closing of the grippers at different points in their movement to engage the advance edges of sheets of various lengths, and means controlling the opening of the grippers to release the sheets.

5. In a sheet delivery apparatus for printing machines, printing and impression cylinders arranged to travel at a certain speed, a delivery device having grippers arranged to travel at a lower speed, means extending along beneath the delivery device arranged to travel at the surface speed of the cylinders for feeding sheets to the grippers, fixed means controlling the opening of the grippers to receive the sheets, adjustable means for controlling the closing of the grippers at different points in their movement to engage the advance edges of sheets of various lengths and means controlling the opening of the grippers to release the sheets.

6. In a sheet delivery apparatus for printing machines, printing and impression cylinders arranged to travel at a certain speed, an endless delivery carrier having grippers thereon, arranged to travel at a lower speed, an endless tpe carrier extending along beneath the delivery carrier, arranged to travel at the surface speed of the cylinders for feeding sheets to the grippers, fixed means controlling the opening of the grippers to receive the sheets, adjustable means for controlling the closing of the grippers at different points in their movement to receive the advance edges of sheets of various lengths and means controlling the opening of the grippers to release the sheets.

7. In a sheet delivery apparatus for printing machines, a delivery device having grippers, means extending along beneath the delivery device for feeding sheets to the grippers, a cam having a fixed member controlling the opening of the grippers to receive the sheets, and a longitudinally adjustable member controlling the closing of the grippers at different points in their movement to engage the advance edges of sheets of various lengths, and a cam controlling the opening of the grippers to release the sheets.

8. In a sheet delivery apparatus for printing machines, a delivery device having grippers arranged to travel at a certain speed, means extending along beneath the delivery device, arranged to travel at a higher speed for feeding sheets to the grippers, a cam having a fixed member controlling the opening of the grippers to receive the sheets, and a longitudinally adjustable member controlling the closing of the grippers at different points in their movement to engage the advance edges of sheets of various lengths, and a cam controlling the opening of the grippers to release the sheets.

9. In a sheet delivery apparatus for printing machines, an endless delivery carrier having grippers thereon, an endless tape carrier extending along beneath the delivery carrier for feeding sheets to the grippers, a cam having a fixed member controlling the opening of the grippers to receive the sheets, and an adjustable member controlling the closing of the grippers at different points in their movement to engage the advance edges of sheets of various lengths, and a cam controlling the opening of the grippers to release the sheets.

10. In a sheet delivery apparatus for printing machines, an endless delivery carrier having grippers thereon, arranged to travel at a certain speed, an endless tape carrier extending along beneath the delivery carrier, arranged to travel at a higher speed for feeding sheets to the grippers, a cam having a fixed member controlling the opening of the grippers to receive the sheets, and an adjustable member controlling the closing of the grippers at different points in their movement to engage the advance edges of sheets of various lengths, and a cam controlling the opening of the grippers to release the sheets.

11. In a sheet delivery apparatus for printing machines, printing and impression cylinders arranged to travel at a certain speed, a delivery device having grippers arranged to travel at a lower speed, means extending along beneath the delivery device, arranged to travel at the surface speed of the cylinders for feeding sheets to the grippers, a cam having a fixed member controlling the opening of the grippers to receive the sheets, and a longitudinally adjustable member controlling the closing of the grippers at different points in their movement to engage the advance edges of sheets of various lengths, and a cam controlling the opening of the grippers to release the sheets.

12. In a sheet delivery apparatus for printing machines, printing and impression cylinders arranged to travel at a certain speed, an endless delivery carrier having grippers thereon, arranged to travel at a lower speed, an endless tape carrier extending along beneath the delivery carrier, arranged to travel at the surface speed of the cylinders for feeding sheets to the grippers, a cam having a fixed member controlling the opening of the grippers to receive the sheets, and a longitudinally adjustable member controlling the closing of the grippers at different points in their movement to engage the advance edges of sheets of various lengths, and a cam controlling the opening of the grippers to release the sheets.

In testimony, that I claim the foregoing as my invention, I have signed my name in presence of two witnesses, this first day of October, A. D. 1912.

HOWARD M. BARBER.

Witnesses:
  A. R. STILLMAN.
  E. M. GRANT.